United States Patent
Walker et al.

(10) Patent No.: US 7,512,841 B2
(45) Date of Patent: Mar. 31, 2009

(54) METHOD AND SYSTEM FOR NETWORK FAULT ANALYSIS

(75) Inventors: Anthony Paul Michael Walker, Fort Collins, CO (US); Darren D. Smith, Fort Collins, CO (US); David M. Rhodes, Loveland, CO (US); Srikanth Natarajan, Fort Collins, CO (US); Kam Chooi Wong, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 585 days.

(21) Appl. No.: 10/972,045

(22) Filed: Oct. 22, 2004

(65) Prior Publication Data

US 2006/0107086 A1 May 18, 2006

(51) Int. Cl.
*G06F 11/00* (2006.01)
(52) U.S. Cl. ............................. 714/43; 714/46
(58) Field of Classification Search .................. None
See application file for complete search history.

(56) References Cited

U.S. PATENT DOCUMENTS

| | | | | | |
|---|---|---|---|---|---|
| 5,157,667 | A | * | 10/1992 | Carusone et al. ............... | 714/45 |
| 5,436,909 | A | * | 7/1995 | Dev et al. ........................ | 714/4 |
| 5,995,485 | A | * | 11/1999 | Croslin ......................... | 370/216 |
| 6,061,723 | A | | 5/2000 | Walker et al. | |
| 6,072,777 | A | * | 6/2000 | Bencheck et al. ........... | 370/244 |
| 6,651,189 | B1 | * | 11/2003 | Jeon et al. ...................... | 714/43 |
| 6,813,634 | B1 | * | 11/2004 | Ahmed ......................... | 709/224 |
| 7,020,076 | B1 | * | 3/2006 | Alkalai et al. ................ | 370/217 |
| 7,028,228 | B1 | * | 4/2006 | Lovy et al. ..................... | 714/57 |
| 7,043,661 | B2 | * | 5/2006 | Valadarsky et al. ............ | 714/4 |
| 7,103,807 | B2 | * | 9/2006 | Bosa et al. ..................... | 714/43 |
| 7,287,192 | B1 | * | 10/2007 | Engel ........................... | 714/43 |
| 2006/0087976 | A1 | * | 4/2006 | Rhodes et al. ............... | 370/242 |

OTHER PUBLICATIONS

Walker et al. U.S. Appl. No. 10/355,002, filed Jan. 31, 2003, entitled "Method of Indicating a Path in a Computer Network".
Walker et al. U.S. Appl. No. 10/355,062, filed Jan. 31, 2003, entitled "Method of Determining a Mesh in a Computer Network".

* cited by examiner

*Primary Examiner*—Gabriel L Chu (57) ABSTRACT

A method and system for locating a fault in a network. According to the system, an address analyzer and interface analyzer of a network manager of the network detect that there is a failure associated with a node of the network, a node analyzer of the network manager determines if the node responds to a poll, and if the node does not respond to the poll, a neighbor analyzer of the network manager models the failure, further comprising determining a number and a polling of a plurality of neighbor nodes of the node and assigning the fault in accordance with the number and the polling of the plurality of neighbor nodes According to the method, in response to a node having one or more of one or more addresses and one or more interfaces that fail to respond to a poll, polling the node and polling a plurality of neighbor nodes of the node and assigning the fault in accordance with the polling of the node and a number and the polling of the plurality of neighbor nodes.

28 Claims, 6 Drawing Sheets

610 — If the addresses or interfaces on a node fail to poll, poll the node itself using a second poll.

620 — Poll the neighbors of the node and assign the fault based upon the response of the node, number of neighbors and their response

METHOD AND SYSTEM FOR NETWORK FAULT ANALYSIS

TECHNICAL FIELD

The present invention relates generally to communications networks and, more particularly, to a system and a method for network failure analysis in a communications network.

BACKGROUND

Modern communication networks are composed of many nodes that are interconnected to facilitate communication and provide redundancy. These nodes may be interconnected via cables, twisted pair, shared media or similar transmission media. Each node may include, for example, communication devices, interfaces, and addresses. The topology that describes how the nodes of a communication network are interconnected can be complicated. When there is a failure within the communication network, a network manager needs to accurately determine where the failure occurred and the severity of the failure without generating too much superfluous information about nodes impacted by the failure. One approach to determine the location of a network failure involves analysis of the route information that is available to a network manager. In a simple network without redundancy, path analysis may be used to locate a network failure. However, when the network has many nodes and uses fault tolerant redundancy, the route information may not correctly identify the node that caused the failure.

Modern networks include redundancy in the data link and routing layers. Even so, when a core device fails in the network it can cause different parts of the network to be disconnected from a network management station. It is the responsibility of the network management system poller and analyzer to find these faults and determine the root cause without burdening the operator with superfluous information about impacted devices. The redundancy in the network connections and failover protocols utilized by devices make it difficult for the management station's poller/analyzer to determine the current route from a management station to a specific device. This problem is compounded in a duplicate IP network where Network Translation Devices are utilized. As a result, failure analysis techniques using path information are unreliable for modern networks.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Figure 1:
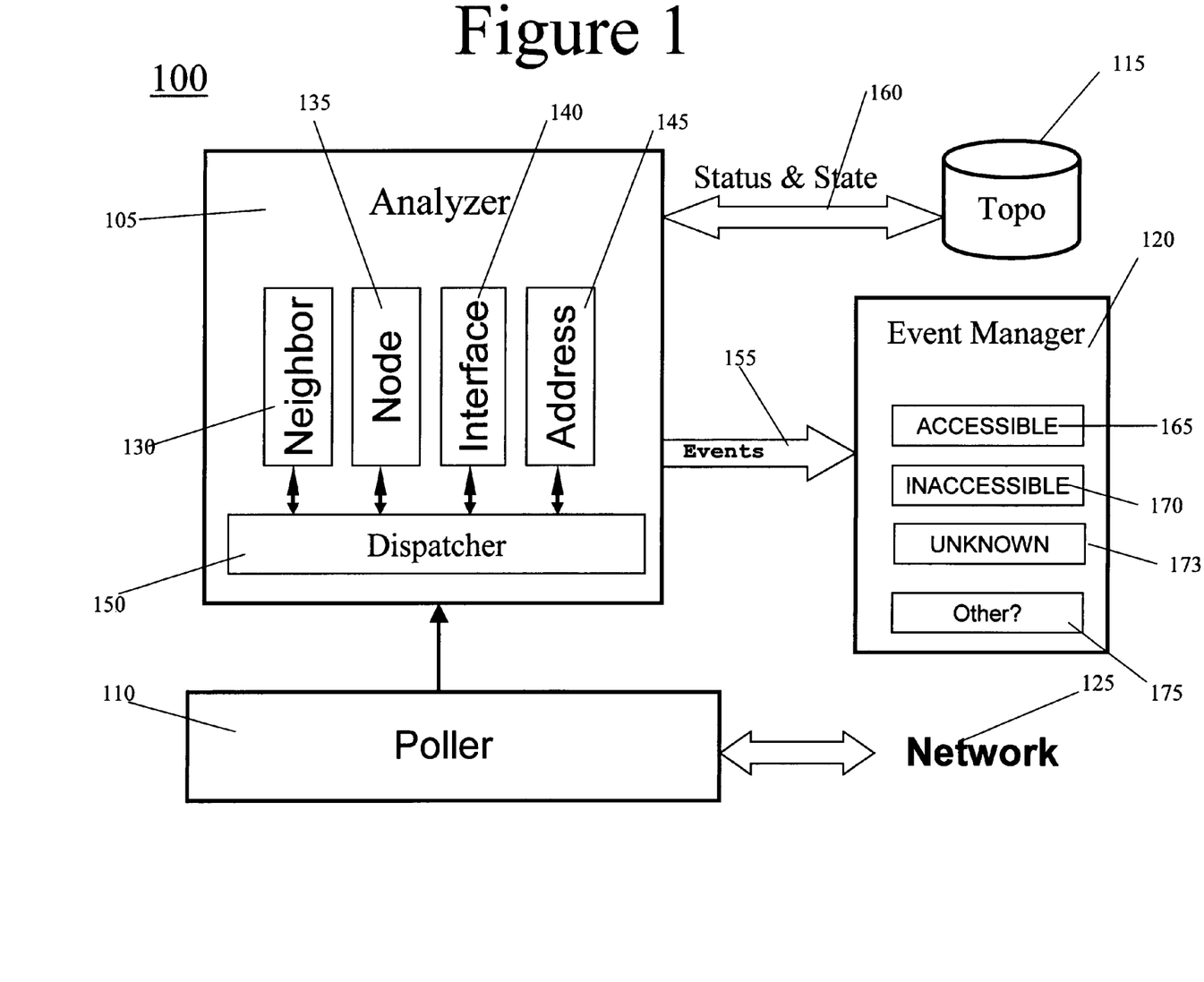
FIG. 1 is a system level diagram of network manager including the neighbor analysis architecture, according to a certain embodiment of the present invention.

With reference to FIG. 1 a system level diagram of a network manager 100 including the neighbor analysis architecture is shown, according to a certain embodiment of the present invention. Note that the functionality of FIG. 1 shows those components that are related to neighbor analysis, while the network manager 100 may contain additional functionality. It is further noted that the components shown in FIG. 1 may be distributed throughout network 125 without departing from the spirit and scope of the invention. Poller 110 interacts with network 125 to determine a status of nodes and of the devices coupled to nodes of network 125. Devices may comprise, for example, network interfaces and their addresses, connections, computers, routers, network address translation (NAT) subsystems, end node, and egress routers. An egress router is defined to be that node that is one hop downstream (away from the network manager 100) from a NAT node. An end node is a node that is not a switch or router. Note that the terms event and alarm are used interchangeably.

When a node fails or a device coupled to the node fails, analyzer 105 interacts with poller 110 and the status and state information 160 received from topology 115 of the network 125 to localize the failure. The analyzer 105 further comprises an address analyzer 145, interface analyzer 140, node analyzer 135 and neighbor analyzer 130. Dispatcher 150 interacts with poller 150, address analyzer 145, interface analyzer 140, node analyzer 135 and neighbor analyzer 130 to ensure that the appropriate level of analysis used has the necessary information. In certain embodiments, a containment hierarchy is used so that a location of the failure is determined by applying address analyzer 145 first then interface analyzer 140 is applied, then node analyzer 135 is applied and then neighbor analyzer 130 is applied. This bottom-up analysis technique is useful in locating a failure while also minimizing the number of peripheral devices that are reported to the network manager 100.

Neighbor analyzer 130 receives the status and state information 160 from the network topology 115 and processes this information to determine the location of the failure. As a result of applying one or more of address analyzer 145, interface analyzer 140, node analyzer 135 and neighbor analyzer 130, events 155 are generated that are useable by event manager 120. Event manager 120 processes events 155 to determine if an element is accessible(165), inaccessible(170), unknown (173), or another event (175) has occurred such as a predefined failure. An element is one or a node, interface, address, connection, and transmission media. An element is defined to be inaccessible if there is no response from an SNMP or ICMP type command or an element of a node is inoperative. An element is defined to be accessible if it responds to an SNMP or ICMP type command.

It is noted that the components of FIG. 1 are arranged for exemplary purposes, and other arrangements are possible without departing from the spirit and scope of the present invention. For example, the functionality of dispatcher 150 may be subsumed into one or more of analyzer 105, address analyzer 145, interface analyzer 140, node analyzer 135 and neighbor analyzer 130. It is further noted that while network 125 may contain a great many nodes, the analyzers in FIG. 1 such as neighbor analyzer 130 may in certain embodiments only poll and interact with a subset of the nodes in the network 125.

One application of the output of analyzer 105 is a representation of the reachability of the nodes of the network 125, as indicated by a health parameter. For example, for a given fault, the network 125 may be partitioned into a Normal area, a Fault area, and a Far-From-Fault area:

Normal Area: The area of the network near the manager 100 where all the devices are operational and can be accessed via ICMP or SNMP. This area could be large (multiple hops).

Fault Area: This area includes nodes that contain a fault or are directly connected to a device downstream from the network manager 100 that contains a fault.

Far-From-Fault Area: This corresponds to devices that are downstream from the fault. That is, if you traverse a path from the network manager 100 to these devices, you will pass through the Normal Area and then the Fault Area and finally devices in the Far-From_Fault Area.

The analyzer 105 handles each of these areas differently:

Normal Area: These devices are up and responding. The status should be Normal or accessible for nodes. In addition, this area should be accessible for interfaces, and addresses with regard to the fault being analyzed. An alarm may have been output if the device was in the fault area and the fault has been fixed.

Fault Area: The analyzer 105 attempts to determine the largest container object that can be considered faulty and marks the status of this container DOWN and emits an alarm for this object. For example, if an interface fails but the node is up, then the analyzer 105 will emit an INTERFACE_DOWN alarm for the interface but no alarm for the node.

Similarly, if the result of the analysis performed by analyzer 105 determines that the node is inaccessible and responsible, it will emit an NODE_DOWN alarm for the node. Objects contained by the node (i.e. interfaces and/or addresses) will be considered secondary failures and brought to status UNKNOWN in the network topology and an INTERFACE_UNREACHABLE or ADDRESS_UNREACHABLE alarm will be emitted as appropriate.

Similarly, an interface in the network topology may or may not contain one or more addresses. If an interface status goes Down or Unreachable, all contained addresses (that are polled) will change status to Unknown and an ADDRESS_UNKNOWN alarm to be emitted.

In certain embodiments, an alarm name containing the term "DOWN" implies primary failure (e.g. NODE_DOWN). An alarm name containing the term "UNREACHABLE" implies secondary failure (e.g. NODE_UNREACHABLE). That is, objects that are experiencing a secondary failure are failing because of a primary failure object. Alarms for secondary failures are not directly visible in an alarm browser of the network manager 100.

Far-From-Fault Area: Since this area consists of nodes that are not faulty but are impacted by the fault, no alarm is emitted but the status is set to UNKNOWN so that a network manager interface shows the impact. Inhibiting alarm generation in this area eliminates clutter in the network manager 100 for devices that are not broken and inhibiting alarm generation is operable to greatly improve the performance of the alarm system. For example, if a fault caused 1,000 nodes to be inaccessible, the result of neighbor analysis might generate 10 alarms for the Fault Area and change status for 10,000 objects in the Far-From-Fault Area. That is, 10 alarms might be generated for each of the inaccessible nodes (One for the node, one for each interface and one for each address). By not generating the corresponding 10,000 alarms in the Far-From-Fault Area, we keep 10,000 alarms from slowing inaccessible the network manager 100.

When the analyzer 105 observes that a node does not respond to any poll, it uses the neighbor analyzer 130 to determine if the node is in the Fault Area or the Far-From-Fault Area. To do this, the neighbor analyzer 130 examines the health of all the nodes that the node connects to. That is, the neighbor analyzer 130 checks the health of all the immediate neighbor nodes. If all the neighbor nodes are inaccessible, then the node is in the Far-From-Fault Area.

Figure 2:
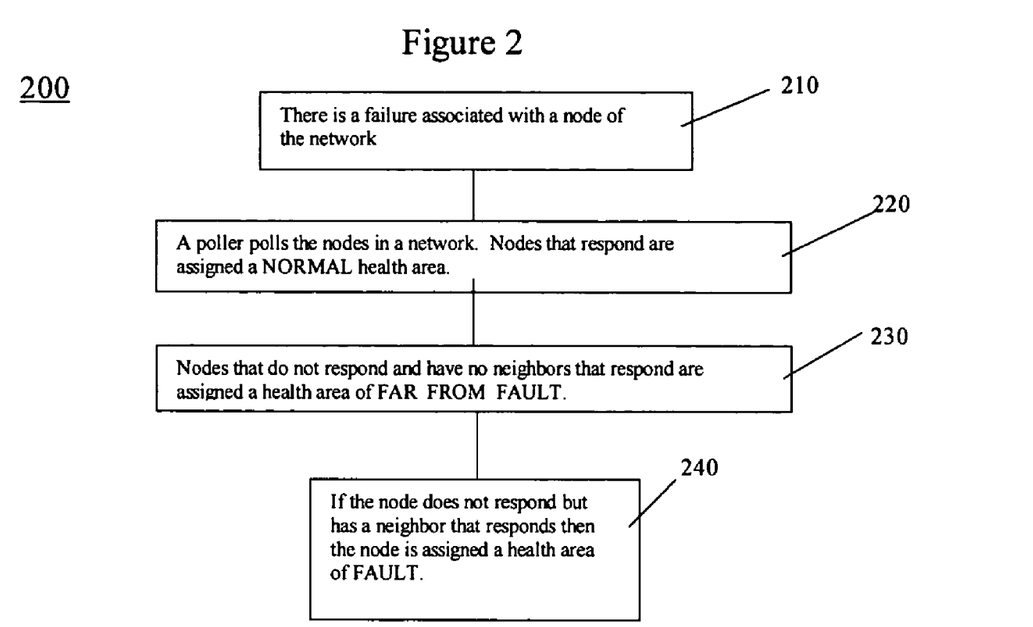
FIG. 2 is a simplified flow diagram of assigning health area to nodes of the network using the neighbor analysis method, according to a certain embodiment of the present invention.

The above discussion may be summarized with reference to FIG. 2, which shows a simplified flow diagram 200 of assigning health area to nodes of the network using the neighbor analysis method, according to a certain embodiment of the present invention. In block 210, there is a failure associated with a node of the network 125. This failure could be with the node itself or with an interface, address, transmission media or other neighbor nodes associated with the node. Nodes having addresses and interfaces that correctly respond to the periodic network management polls cause the nodes to be given a health area of NORMAL. For nodes that have addresses and interfaces that fail to respond, a ping-type command is used by the analyzer 105 to determine if the nodes themselves are reachable (block 220). This ping-type command may be issued directly to the node (for example a computer or router) provided a communication path is available. It is noted that in certain embodiments of the present invention, a ping-type command is one that employs protocol specific commands such as those used in SNMP and ICMP. If the node responds, the node is again given a health area of NORMAL. If a node is not reachable and the node has no reachable neighbors, then the node is given a health area of FAR_FROM_FAULT as in block 230. If any neighbors of the node are reachable, but the node itself does not respond to a poll, then the node is given a health area of FAULT (block 240).

There are many ways to organize the various status variables associated with the health of a node and its connections. In certain embodiments, the node may have an associated health area, node status, and display color. For example, nodes that are in the Normal area could be displayed using green, have node status ACCESSIBLE, and transmit a NODE_ACCESSIBLE alarm. Nodes that are FAR_FROM_FAULT could be displayed using blue, have an UNKNOWN node status, and not generated any alarm. Nodes that are in the Fault area could be displayed in red, have a CRITICAL node status, and cause a NODE_DOWN alarm to be generated if the node is the cause of the fault. Elements in the Fault area that are not responsible for the fault could be displayed using blue, UNKNOWN status, and generate a ELEMENT_UNREACHABLE alarm. Recall, that as defined previously, an element is one or a node, interface, address, connection, and transmission media. Clearly other assignments and labels may be used provided that logical consistency is maintained. For example, a Normal node and a Fault node would probably not share the same color, since status information would be lost. In certain embodiments of the invention, the following designators are used:

| Designator | (color, health area, element status, alarm) |
|---|---|
| accessible | (green, NORMAL, ACCESSIBLE, ELEMENT_ACCESSIBLE) |
| FFF | (blue, FAR_FROM_FAULT, UNKNOWN, NONE) |
| inaccessible_responsible | (red, FAULT, CRITICAL, ELEMENT_DOWN) |
| inaccessible_notResponsible | (blue, FAULT, UNKNOWN, ELEMENT_UNREACHABLE) |

So, it is noted that a node is ACCESSIBLE if it can be accessed using ping-type commands like those found in SNMP and ICMP, and neighbor analysis is used to assign to a particular designator to an element of the network 125.

Figure 3:
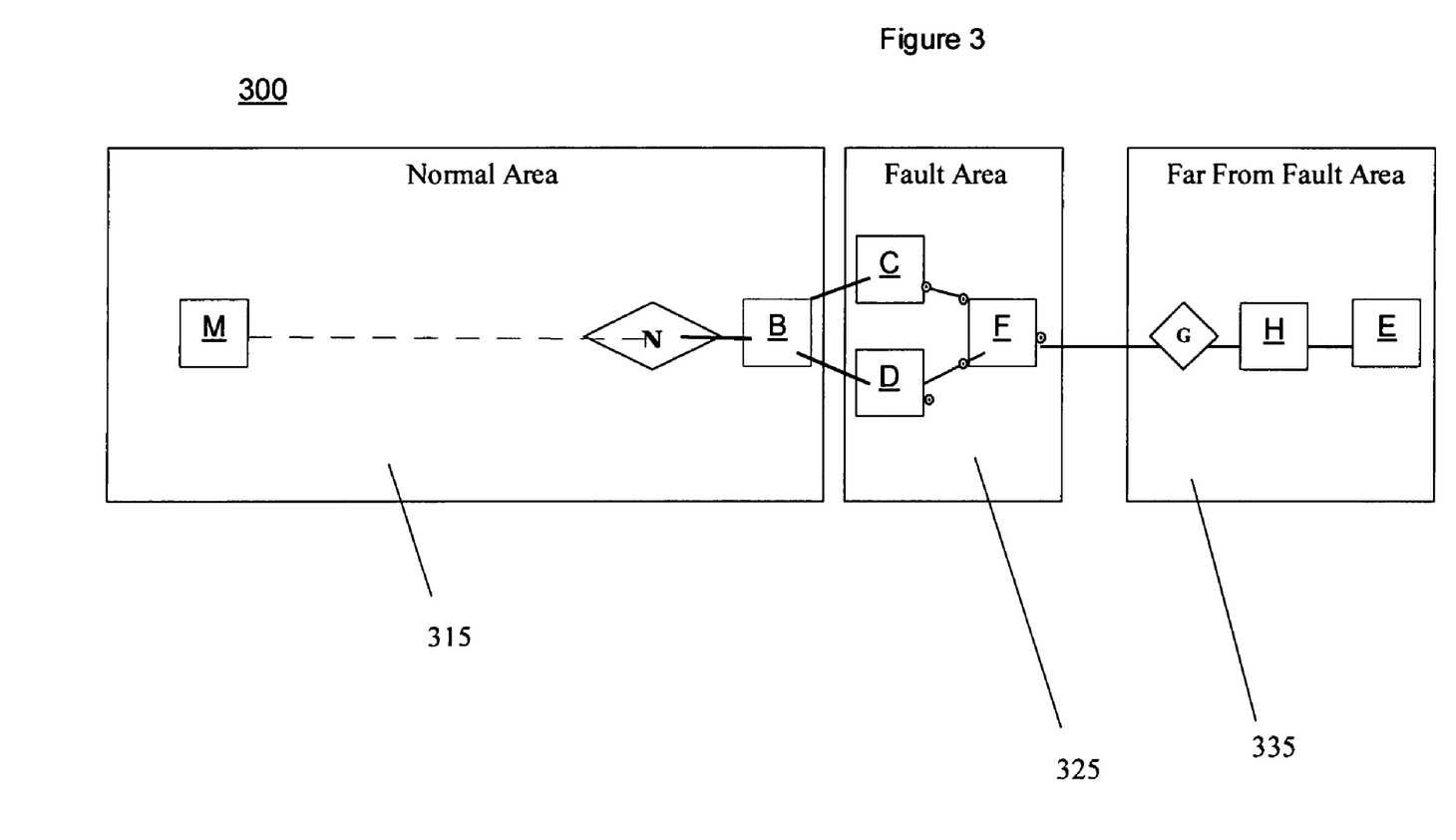
FIG. 3 is a first simple example illustrating how health area may be assigned to nodes of a network, according to a certain embodiment of the present invention.

Referring now to FIG. 3, a first simple example 300 illustrating how health area may be assigned to nodes of a network is shown, according to a certain embodiment of the present invention. In this example, suppose that node F fails and nodes G, H and E are inaccessible to a management station (MS) of the network manager 100. The failure of node F will cause all of the interfaces of node F to fail and this will cause the connected interfaces on nodes C and D to fail. That is, the interfaces on C and D that connect to node F will be inaccessible but the nodes C and D will still be accessible to the management station. The node N and B remain up since they are accessible by the management station and away from the fault. Thus, nodes N and B are in the Normal Area 315.

When the neighbor analyzer 130 analyzes node E it observes that there is only one neighbor (H) and that it is inaccessible. Therefore, E is in the Far-From-Fault Area 335. Similarly, node H is in the Far-From-Fault Area 335 because neighbors G and E are inaccessible. Node G is in the Far-From-Fault Area 335 because neighbors F and H are inaccessible. Their node and interface status is set to UNKNOWN. No alarms are generated for these nodes.

When the neighbor analyzer 130 analyzes node F, it observes that neighbor G is inaccessible but neighbor C and D are accessible. Therefore, node F is in the Fault Area 325. In this specific situation, the neighbor analyzer 130 concludes that the fault is node F because multiple accessible nodes (C and D) have connections to F that are inaccessible. Therefore, the node status of F is set to CRITICAL and a NODE_DOWN F alarm is generated. In this case, the largest container that is faulty is the node (F). The status is set to UNKNOWN for all of the interfaces of F and an INTERFACE_UNREACHABLE alarm is generated for the interface which connects to G. A CONNECTION_UNREACHABLE alarm is generated for the interfaces that connect to C and D.

When the analyzer 105 analyzes node C it observes that one interface is inaccessible (the one that connects to F). Instead of generating an INTERFACE_UNREACHABLE alarm for the interface of C which connects to F and the interface of F which connects to C, a single alarm CONNECTION_UNREACHABLE C.1 F.2 is generated where .1 and .2 represent the interfaces of C and F respectively. That is, the CONNECTION_UNREACHABLE alarm specifies two interfaces and describes the connection instead of a single interface. This kind of interface alarm is used any time one of the nodes is accessible.

In summary, the analyzer 105 finds the nodes and interfaces that are in the Fault Area 325 using the neighbor analyzer 130 and modifies the status appropriately and sends out the appropriate alarms. In addition, the analyzer finds the nodes in the Far-From-Fault Area 335 and adjusts the status appropriately but does not generate any alarms at all.

Figure 4:
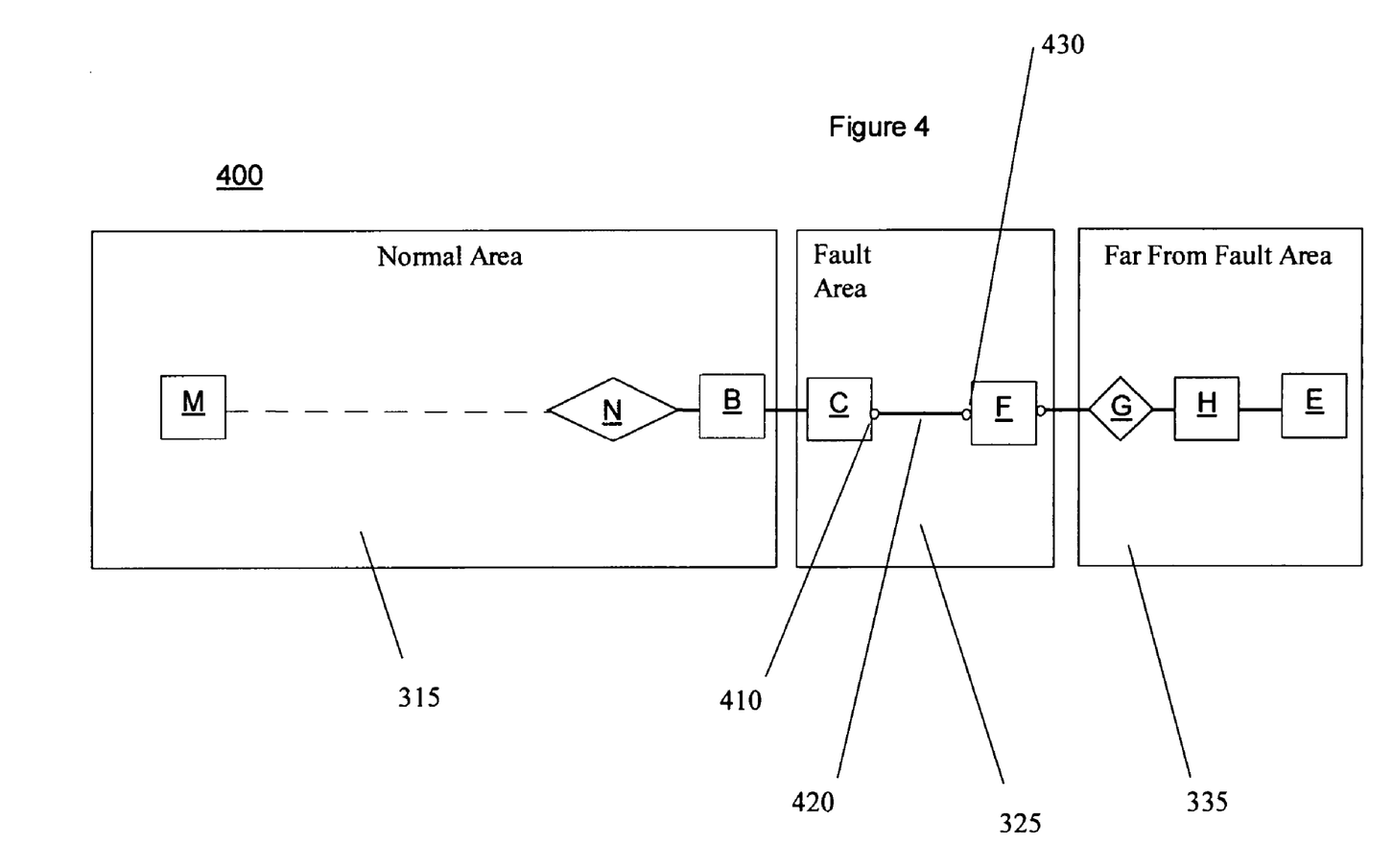
FIG. 4 is a second simple example illustrating how health area may be assigned to nodes of a network, according to a certain embodiment of the present invention.

Referring now to FIG. 4, a second simple example 400 illustrating how health area may be assigned to nodes of a network is shown, according to a certain embodiment of the present invention. This example is similar to that of FIG. 3, except that now there is only a single connection between C and F. In this second example a failure of interface 430 causes connection (410, 420, 430) to be inaccessible_responsible, and a CONNECTION_DOWN alarm is generated for connection (410, 420, 430). Note that since neighbor C of F is accessible, node F is in the Fault Area 325. Node C remains in the Fault area 325, since node B is reachable and C has a connection that is inaccessible. Since node F has only a single connection to management station, the primary failure is the connection and node F is a secondary failure.

Figure 5:
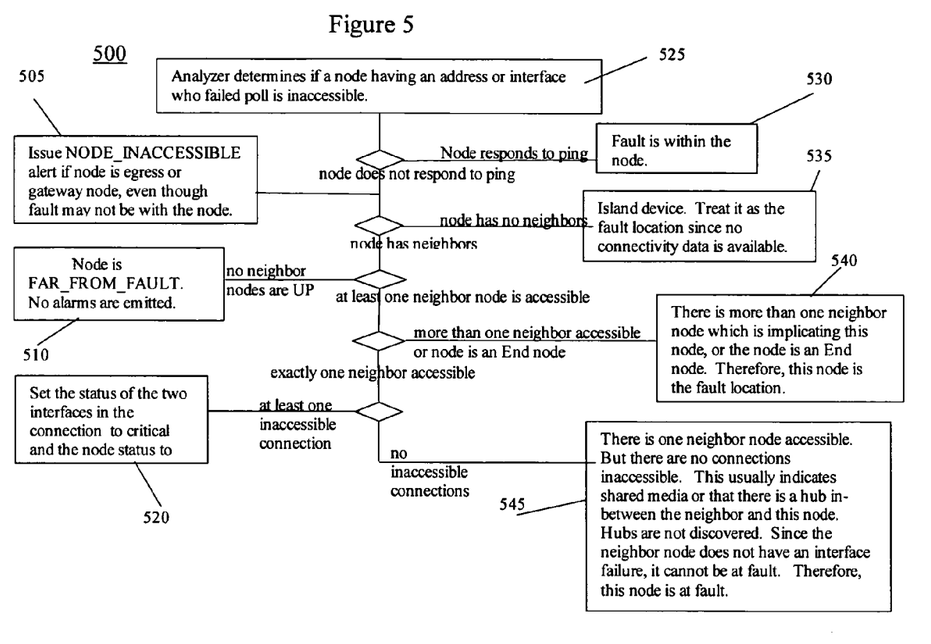
FIG. 5 is a detailed flow diagram of the neighbor analysis method, according to a certain embodiment of the present invention.

Referring now to FIG. 5, a detailed flow diagram 500 of the neighbor analysis method is shown, according to a certain embodiment of the present invention. In block 525, the analyzer determines if a node having a failed address or failed interface is accessible via a ping-type command. If the node responds to the ping-type command, then the fault is within the node (block 530). If the node does not respond to the ping-type command, then a NODE_DOWN alert is issued when the node is an egress node or NAT node (block 505). It is noted that in certain embodiments the node is operable to respond to the ping-type command even when the node has one or more addresses or interfaces that are inoperable. In certain embodiments, this alert occurs even if the fault is not within the node. A node that does not respond to the ping-type command and has no neighbors is an island device and is treated as a fault (block 535). If the node has no neighbors that are ACCESSIBLE (respond to a ping-type command), then the node is given a FAR_FROM_FAULT health area and no alarms are issued (block 510).

However, if more than one neighbor node is accessible or if the node is an end node, then the node is assumed to be location of the fault (block 540). In this case there is more than one node that is able to communicate but cannot communicate with the node. The elements of FIG. 5 allow a network manager to view those alarms that are important while suppressing alarms for those nodes that did not cause the failure. The flowchart of FIG. 5 may be summarized in the blocks shown in FIG. 6. Network manager 100 periodically polls the interfaces and address of nodes in network 125. If a node's interfaces or addresses fail to poll, then the node itself is polled using a ping-type command(block 610). If the node fails to poll, then the neighbor analyzer 130 is used to poll the neighbors of the node and an assignment of the fault location is made using the number of neighbors and the neighbor poll results (620).

Figure 6:
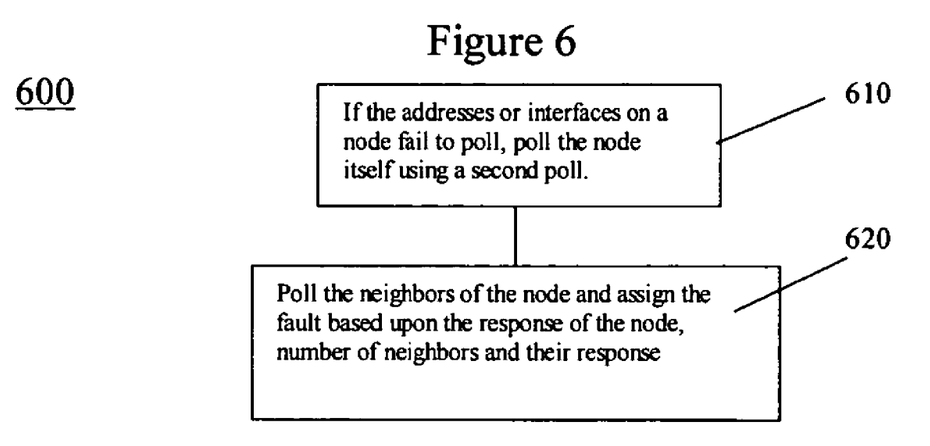
FIG. 6 is a simplified flow diagram of the neighbor analysis method, according to a certain embodiment of the present invention.

One distinction that is inherent in FIGS. 2 and 5 is the notion of root cause versus impact. The discussion of FIG. 5 and FIG. 6 is related to how to determine the location of a failure in a node of the network 125, while the discussion of FIG. 2 is more closely related to the impact of a failure on other nodes in the network 125. So, if a node or interface fails then it would be an advantage to locate the source of the failure and then handle the effect of the failure without generating unneeded alerts that must be viewed by a user of network manager 100.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method for locating a fault in a network, comprising:
in response to a node having one or more of one or more addresses and one or more interfaces that fail to respond to a poll, polling the node itself; and
if the node fails to respond, polling a plurality of neighbor nodes of the node and assigning the fault in accordance with a number and the polling of the plurality of neighbor nodes, wherein assigning the fault in accordance with the polling of the node and the number and the polling of the plurality of neighbor nodes further comprises:
if the node does not respond, further comprising performing:
if the node is one hop downstream from a NAT router, determining that the fault is with the node;
if the node is the NAT router, determining that the fault is with the node;
if the node has no neighbors, determining that the fault is with the node;
if the node has no neighbors that respond to the polling of the plurality of neighbor nodes, not generating an alarm;
if the node has neighbors that respond to the polling of the plurality of neighbor nodes, further comprising:
if the node is an end node, determining that the fault is with the node;
if there is more than one neighbor that responds to the polling of the plurality of neighbor nodes, determining that the fault is with the node; and
if there is exactly one neighbor that responds to the polling of the plurality of neighbor nodes and there is more than one connection inaccessible determining that the fault is with the connection, otherwise the fault is with the node.

2. The method of claim 1, wherein polling the node is accomplished using a ping-type command.

3. The method of claim 1, wherein polling the plurality of neighbor nodes of the node further comprises performing one or more of:
if none of the neighbor nodes respond to the polling, then designating the node far from fault (FFF);
if more than one of the neighbor nodes respond to the polling, then designating the node inaccessible_responsible;
if exactly one of the neighbor nodes responds to the polling and there is at least one inaccessible connection for that node, then designating the node connection inaccessible_responsible and designating the node inaccessible_notResponsible; and
if exactly one of the neighbor nodes respond to the polling and there is no inaccessible connection for that node, then designating the node inaccessible_responsible.

4. The method of claim 3, wherein the designation of inaccessible_responsible indicates that the location of the fault is that element being designated inaccessible_responsible.

5. A method for reducing a number of events generated in a network manager when there is a failure in a node of one or more nodes of a network, said network having a plurality of nodes, comprising:
polling each node of the one or more nodes of the network:
assigning a health area NORMAL to the node if the node responds to the polling;
assigning the health area FAR_FROM_FAULT to the node if the node does not respond to the polling and none of the neighbors of the node respond to the polling;
assigning the health area FAULT if the node does not respond to the polling and at least one neighbor responds to the polling; and
assigning a designation of INACCESSIBLE_RESPONSIBLE for the following conditions:
if the node does not respond to the polling and the node is one hop from a NAT router;
if the node does not respond to the polling and the node is a NAT router;
if the node does not respond to the polling and the node has no neighbors;
if the node does not respond to the polling, the node is an end node, and the node has no neighbors that respond to the polling;
if the node does not respond to the polling and the node has more than one neighbor that responds to the polling;
if the node does not respond to the polling, the node has exactly one neighbor that responds to the polling, and the node has no connections that do not respond to a second poll; and
if the node does not respond to polling, and there are no nodes that are neighbors to the node, and so the node is treated as an island node.

6. The method of claim 5, wherein the health area of NORMAL is correlated with a NODE_ACCESSIBLE alarm.

7. The method of claim 5, further comprising assigning a designation of INACCESSIBLE_NOTRESPONSIBLE if the node does not respond to the polling and only one neighbor node of the node responds to the polling and the node has at least one connection that does not respond to a second poll.

8. The method of claim 7, wherein the designation of INACCESSIBLE_NOTRESPONSIBLE is correlated with an UNKNOWN node status.

9. The method of claim 7, further comprising generating a CONNECTION_DOWN alarm upon assigning INACCESSIBLE_NOTRESPONSIBLE designation to the node.

10. The method of claim 5, wherein the designation of INACCESSIBLE_RESPONSIBLE is correlated with a NODE_DOWN alarm.

11. The method of claim 5, wherein polling the node further comprises polling one or more of one or more addresses and one or more interfaces of the node.

12. The method of claim 5, wherein the health area of NORMAL causes a display of the node to have a first color, the health area of FAULT causes the display of the node to have a second color, and the health area of FAR_FROM_FAULT causes the display of the node to have a third color.

13. The method of claim 5, wherein a neighbor node is considered to have responded to a poll if communication is achieved with a management address of the neighbor node.

14. The method of claim 5, wherein the node has a node status of UNKNOWN if the node is assigned a FAR_FROM_FAULT health area.

15. The method of claim 5, wherein the node has a designation of ACCESSIBLE if the node is assigned a NORMAL health area.

16. The method of claim 5, wherein one or more ADDRESS_UNREACHABLE and INTERFACE_UNREACHABLE alarms are generated upon the node being assigned the FAULT health area.

17. The method of claim 5, further comprising if the node has a health area of NORMAL, but has an interface connected to a second node with a designation of INACCESSIBLE_RE- SPONSIBLE, generating a single CONNECTION_UNREACHABLE alarm for the node's connection to the second node.

18. The method of claim 17, wherein a connection comprises two interfaces and a transmission medium.

19. The method of claim 5, further comprising polling the node prior to polling each node of the one or more nodes, wherein if the node responds to the polling, then assigning the node the health area of Normal.

20. A method for locating a fault in a network, comprising:
in response to a node having one or more of one or more addresses and one or more interfaces that fail to respond to a poll, determining if the node responds to a ping-type command;
if the node does not respond, further comprising performing:
if the node is one hop downstream from a NAT router, determining that the fault is within the node;
if the node is the NAT router, determining that the fault is within the node;
if the node has no neighbors, determining that the fault is within the node;
if the node has no neighbors that respond to a second poll, not generating an alarm;
if the node has neighbors that respond to the second poll, further comprising:
if the node is an end node, determining that the fault is within the node;
if there is more than one neighbor that responds to the second poll, determining that the fault is within the node; and
if there is exactly one neighbor that responds to the second poll and there is more than one connection inaccessible determining that the fault is within the connection, otherwise the fault is with the node.

21. The method of claim 20, wherein if the node responds to the ping-type command, then the fault is within the node.

22. The method of claim 20, wherein the ping-type command is one of an ICMP command and an SNMP command.

23. A computer system for locating a fault in a network, comprising:
an address analyzer and interface analyzer of a network manager of the network operative to detect that there is a failure associated with a node of the network;
a node analyzer of the network manager determines if the node responds to a poll; and
if the node does not respond to the poll, a neighbor analyzer of the network manager models the failure, further comprising:
determining a number and a polling of a plurality of neighbor nodes of the node and assigning the fault in accordance with the number and the polling of the plurality of neighbor nodes, wherein assigning the fault in accordance with the polling of the node and the number and the polling of the plurality of neighbor nodes further comprises:
if the node does not respond, further comprising performing:
if the node is one hop downstream from a NAT router, determining that the fault is with the node;
if the node is the NAT router, determining that the fault is with the node;
if the node has no neighbors, determining that the fault is with the node;
if the node has no neighbors that respond to the polling of the plurality of neighbor nodes, not generating an alarm;
if the node has neighbors that respond to the polling of the plurality of neighbor nodes, further comprising:
if the node is an end node, determining that the fault is with the node;
if there is more than one neighbor that responds to the polling of the plurality of neighbor nodes, determining that the fault is with the node; and
if there is exactly one neighbor that responds to the polling of the plurality of neighbor nodes and there is more than one connection inaccessible determining that the fault is with the connection, otherwise the fault is with the node.

24. The system of claim 23, wherein if the node responds to the poll, then the fault is within the node.

25. The system of claim 23, wherein modeling the failure further comprises performing one or more of:
if none of the neighbor nodes respond to the polling, then model the node status as UNKNOWN;
if more than one of the neighbor nodes respond to the polling, then model the node status as CRITICAL;
if exactly one of the neighbor nodes responds to the polling and there is at least one inaccessible connection for that node, then model the node connection status as CRITICAL and model the node status as UNKNOWN; and
if exactly one of the neighbor nodes respond to the polling and there is no inaccessible connection for that node, then model the node status as CRITICAL.

26. The system of claim 23, wherein a CRITICAL node status generates a NODE_DOWN alarm, and a CRITICAL connection status generates a CONNECTION_DOWN alarm.

27. A computer program product for locating a fault in one or more nodes of a network, said computer program product comprising a computer storage medium having computer readable program code thereon, said computer readable program code comprising:
instructions for polling a node having one or more of one or more addresses and one or more interfaces that fail to respond to a poll:
instructions for if the node fails to respond polling a plurality of neighbor nodes of the node and assigning the fault in accordance with a number and a status of the plurality of neighbor nodes of the node; and
if the node fails to respond, instructions for performing:
if the node is one hop downstream from a NAT router, determining that the fault is with the node;
if the node is the NAT router, determining that the fault is with the node;
if the node has no neighbors, determining that the fault is with the node;
if the node has no neighbors that respond to the polling of the plurality of neighbor nodes, not generating an alarm;
if the node has neighbors that respond to the polling of the plurality of neighbor nodes, further comprising:
if the node is an end node, determining that the fault is with the node;
if there is more than one neighbor that responds to the polling of the plurality of neighbor nodes, determining that the fault is with the node; and
if there is exactly one neighbor that responds to the polling of the plurality of neighbor nodes and there is more than one connection inaccessible determining that the fault is with the connection, otherwise the fault is with the node.

28. A computer system for locating a fault in a network, comprising:

in response to a node having one or more of one or more addresses and one or more interfaces that fail to respond to a poll, means for polling the node itself; and if the node fails to respond means for polling a plurality of neighbor nodes of the node and assigning the fault in accordance with a number and the polling of the plurality of neighbor nodes, wherein when the node fails to respond the means for polling a plurality of neighbor nodes of the node and assigning the fault in accordance with a number and the polling of the plurality of neighbor nodes performs:

if the node is one hop downstream from a NAT router, determining that the fault is with the node;

if the node is the NAT router, determining that the fault is with the node;

if the node has no neighbors, determining that the fault is with the node;

if the node has no neighbors that respond to the polling of the plurality of neighbor nodes, not generating an alarm;

if the node has neighbors that respond to the polling of the plurality of neighbor nodes, further comprising:

if the node is an end node, determining that the fault is with the node;

if there is more than one neighbor that responds to the polling of the plurality of neighbor nodes, determining that the fault is with the node; and     if there is exactly one neighbor that responds to the polling of the plurality of neighbor nodes and there is more than one connection inaccessible determining that the fault is with the connection, otherwise the fault is with the node.

\* \* \* \* \*